United States Patent
Baird

[15] 3,660,721
[45] May 2, 1972

[54] PROTECTIVE EQUIPMENT FOR AN ALTERNATING CURRENT POWER DISTRIBUTION SYSTEM

[72] Inventor: Leslie L. Baird, Swarthmore, Pa.
[73] Assignee: General Electric Company
[22] Filed: Feb. 1, 1971
[21] Appl. No.: 111,236

[52] U.S. Cl. ............................317/16, 317/26, 317/36 TD, 317/46, 317/51
[51] Int. Cl. .......................................................H02h 3/08
[58] Field of Search ..................317/26, 11 R, 16, 36 TD, 46, 317/51

[56] References Cited

UNITED STATES PATENTS

| | | | |
|---|---|---|---|
| 2,571,027 | 10/1951 | Garner | 317/16 |
| 3,215,896 | 11/1965 | Shattuck | 317/16 |
| 3,302,061 | 1/1967 | Edmunds | 317/26 X |
| 3,558,981 | 1/1971 | Zocholl | 317/26 X |

Primary Examiner—James D. Trammell
Attorney—J. Wesley Haubner, William Freedman, Frank L. Neuhauser, Oscar B. Waddell and Joseph B. Forman

[57] ABSTRACT

Protective equipment for an electric power distribution system comprising a bus, a supply circuit connected to the bus through a main circuit breaker, and feeder circuits connected to the bus through feeder circuit breakers. Should a high current fault occur on a feeder circuit, a short circuit is quickly established on the supply circuit on the bus side of the main breaker by means of a triggered vacuum gap device, which is triggered into conduction in response to the fault. This short circuit diverts current from the fault, thereby reducing the interrupting duty on the feeder breaker and enabling it to open on feeder faults producing fault current exceeding its interrupting capacity. After the feeder breaker has opened and before the main breaker can open, the triggered vacuum gap is returned to its normally non-conducting state, thus allowing power from the supply circuit to be restored to the bus.

8 Claims, 3 Drawing Figures

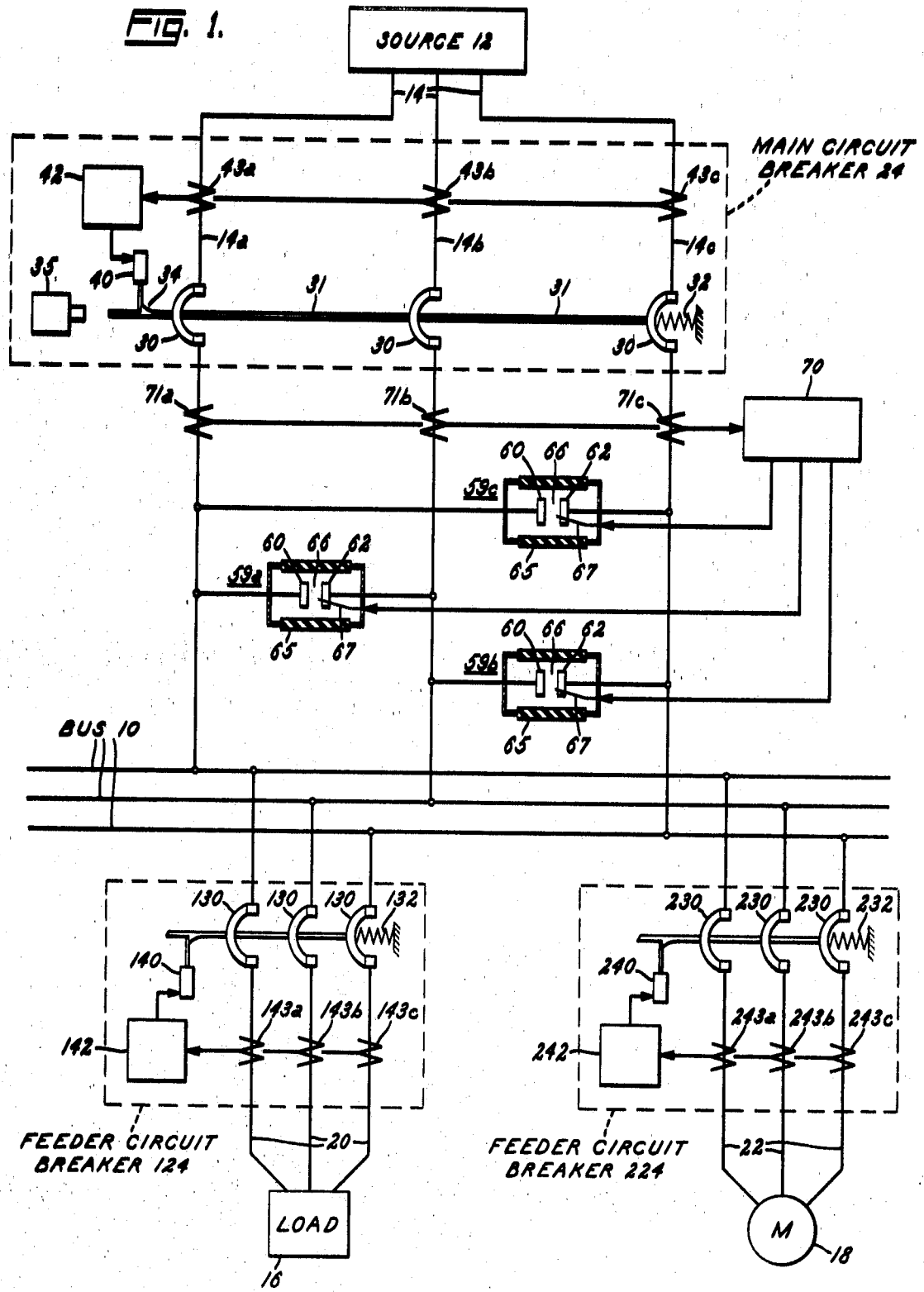

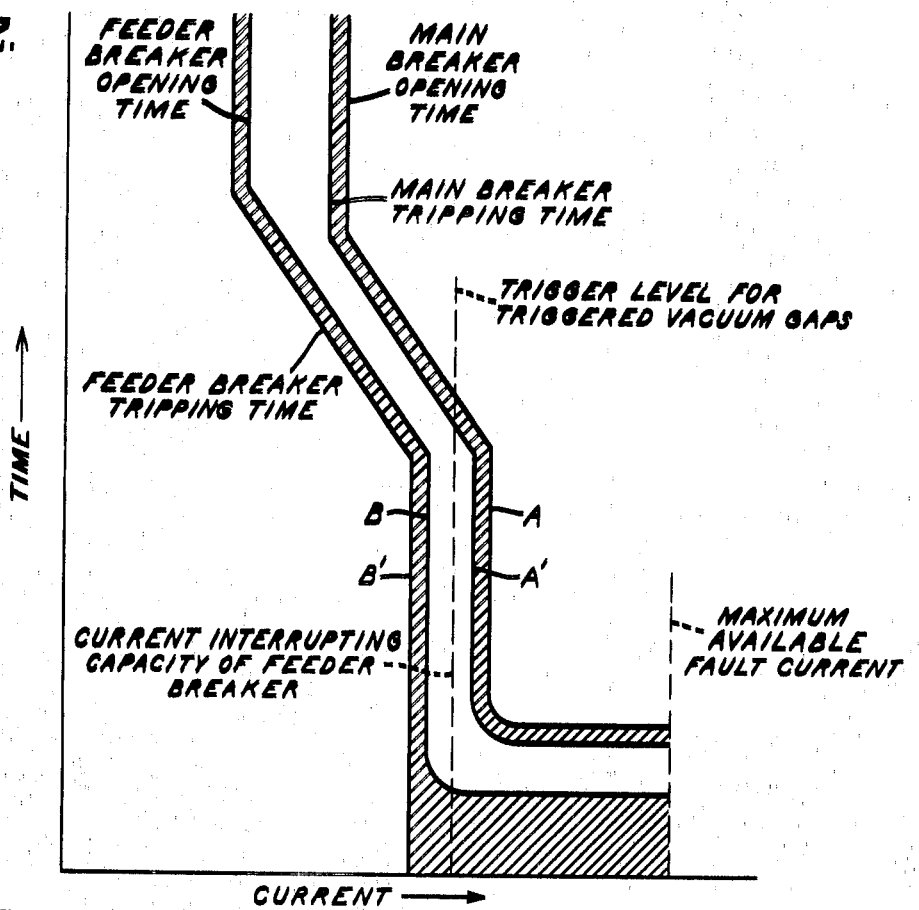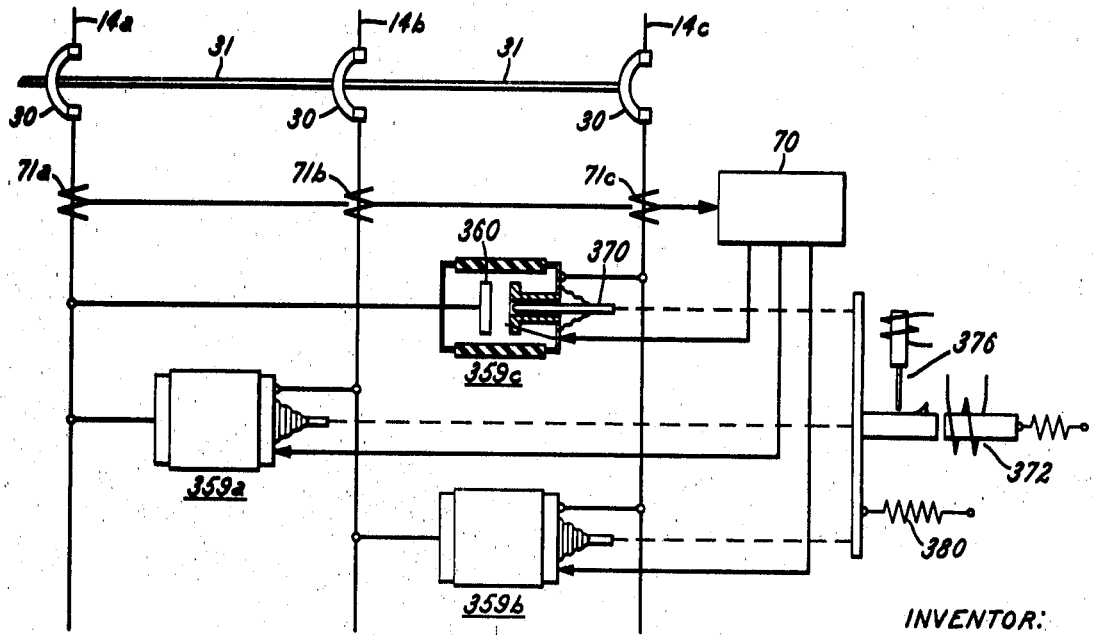

PROTECTIVE EQUIPMENT FOR AN ALTERNATING CURRENT POWER DISTRIBUTION SYSTEM

BACKGROUND

This invention relates to protective equipment for an alternating current power distribution system and, more particularly, relates to protective equipment comprising triggered vacuum gap devices which are immediately triggered into conduction upon the occurrence of a high-current feeder fault to reduce the current flowing through a feeder circuit breaker, thereby reducing the current interrupting duty imposed by the fault upon the feeder circuit breaker.

The power system that I am concerned with comprises a bus, a supply circuit for supplying power to the bus, and a plurality of feeder circuits for feeding power from the bus to various loads. The supply circuit is connected to the bus through a main circuit breaker, and the feeder circuits are connected to the bus through feeder circuit breakers.

In a power system of this type that has selective coordination of its circuit breakers, the various circuit breakers are designed to open with a time delay that varies in duration inversely with respect to magnitude of the current. The time delays are selected so that, for a given overcurrent, the breaker closest to the system's source, i.e., the main circuit breaker, has a longer time delay than the more remote, or feeder, circuit breakers. Thus, for a fault on one of the feeders, the feeder circuit breaker on the faulted feeder will trip open before the main circuit breaker can trip open.

Heretofore, if a selectively coordinated system of this type was to operate with the desired selectivity for all values of fault current up to the maximum available system current, then all of the circuit breakers, including the feeder circuit breakers, were required to have an interrupting capacity at least substantially equal to the maximum available system current. This has necessitated using relatively large and expensive circuit breakers for the feeder circuit breakers.

SUMMARY

An object of my invention is to construct the system in such a manner that the feeder circuit breakers can have a relatively low current-interrupting capacity in comparison to that of the main circuit breaker and yet can isolate from the remainder of the system feeder faults producing much higher currents than the current-interrupting capacity of the feeder circuit breakers.

One way of approaching this objective is to use a form of coordination called "cascading." In a cascaded system, means is provided for instantaneously tripping the main circuit breaker for any currents above a predetermined level that is well below the maximum available system current, thus allowing the main circuit breaker to act as a backup for the feeder circuit breakers during the interruption of such currents. While this type of coordination protects the feeder circuit breaker against damage from the high current feeder faults, it is subject to the disadvantage that the system loses its selectivity at values of current exceeding the instantaneous current pickup level of the main circuit breaker.

Accordingly another object of my invention is to attain the previously-stated object of the invention and yet to maintain selectivity at high currents, even those exceeding the current interrupting rating of the feeder circuit breakers.

In carrying out the invention in one form, I provide means comprising a triggered vacuum gap device for establishing a short circuit on the supply circuit on the bus side of the main circuit breaker when said triggered vacuum gap is triggered into conduction. The triggered vacuum gap is triggered into conduction in response to a fault on any one of the feeder circuits which produces current above the current-interrupting capacity of the associated feeder circuit breaker. Means responsive to said feeder fault is also provided for tripping open the feeder circuit breaker on the faulted feeder and for causing opening to be completed while said gap device is conducting, thus completing opening of the feeder circuit breaker at a time when current therethrough is limited by conduction through said gap device. Conduction through said gap device is terminated after said feeder circuit breaker has completed opening, thus allowing power from the supply circuit to be restored to said bus.

For a better understanding of the invention, reference may be had to the following description taken in conjunction with the accompanying drawings, wherein:

BRIEF DESCRIPTION OF DRAWINGS

FIG. 1 is a schematic diagram of a power distribution system including protective equipment embodying one form of the invention.

FIG. 2 is a graphical representation of certain time-current relationships present in the system of FIG. 1.

FIG. 3 is a schematic diagram of modified protective equipment embodying another form of my invention.

DETAILED DESCRIPTION OF PREFERRED EMBODIMENTS

Referring now to FIG. 1, there is shown a three-phase a-c bus 10 that is supplied with power from a suitable source 12 through a supply circuit 14. Suitable loads, such as 16 and 18, are supplied from the bus 10 through feeder circuits 20 and 22 connected to the bus. Load 18 is illustrated as being a suitable three-phase motor.

Connected in the supply circuit 14 is a main circuit breaker 24 of a conventional design. This circuit breaker comprises a set of relatively movable contacts connected in each phase of circuit 14. Each set of contacts comprises a movable bridging contact 30 that is mechanically coupled to the bridging contact of the remaining sets by insulating means 31. The bridging contacts are biased from their closed position shown toward their open position by means of a suitable opening spring 32. A releasable latch 34 normally holds the movable contacts in their closed position, but when the latch is released, opening spring 32 immediately drives bridging contacts 30 into their open position. The main circuit breaker also comprises a suitable closing device 35, which, upon energization, closes the circuit breaker after it has been opened.

Latch 34 is controlled by suitable tripping solenoid 40, which, in turn, is controlled by a trip-controlling device 42. The trip-controlling device 42 is a conventional overcurrent relay or trip device which serves to trip the latch in response to an overcurrent in any one of the phase conductors 14a, 14b, or 14c of supply circuit 14 in a time varying inversely with the current. The curve A in FIG. 2 is plotted on logarithmic coordinates and illustrates the time required for the main circuit breaker 24 equipped with the overcurrent-responsive trip-controlling device 42 to complete an opening operation for values of current appearing on the abscissa. The Curve A' in FIG. 2 illustrates the time required by the trip-controlling device 42 to initiate a tripping operation. The shaded region between the two curves represents the time during which interruption is occurring.

For supplying information to the trip-controlling device 42 as to the highest value of current in any one of the three phase conductors of the supply circuit 14, three current transformers 43a, 43b, and 43c for the respective phases are provided. The secondaries of these current transformers are connected in circuit in a conventional manner that enables the trip-controlling device 42 to respond to the highest current in any one of the three phases, acting to trip latch 40 in a time that varies with this current in the manner illustrated in curve A' of FIG. 2. Since the circuit connections between the current transformers 43a, 43b, and 43c are conventional, they are depicted in schematic form only. Reference may be had to U.S. Pat. No. 3,153,747-Sofianek et al. for a more detailed description of such circuit connections.

Connected in the feeder circuits 20 and 22 are two feeder circuit breakers 124 and 224, respectively, of generally the same construction as the main circuit breaker 24 described hereinabove. Corresponding parts of feeder circuit breakers 124 and 224 and main circuit breaker 24 have been assigned corresponding reference numerals except that the prefix "1" appears ahead of the numerals of feeder breaker 124 and the prefix "2" appears ahead of the numerals of feeder circuit breaker 224. Trip-controlling device 142 is responsive to overcurrents in any phase of feeder circuit 20 and produces tripping of feeder circuit breaker 124 in a time varying in duration inversely with respect to the magnitude of the overcurrent. Trip-controlling device 242 is responsive to overcurrent in any phase of feeder circuit 22 and produces tripping of feeder circuit breaker 224 in a time varying in duration inversely with respect to the magnitude of the overcurrent. The approximate time-current tripping characteristics of feeder breakers 124 and 224 are illustrated by the curve B' of FIG. 2. Curve B illustrates the time required for the feeder breaker to complete an opening operation. It is to be understood that for high currents in the neighborhood of and higher than the feeder breaker's interrupting capacity, tripping of the feeder breaker is substantially instantaneous and occurs along a horizontal line portion of curve B' which is not shown because it is beneath the abscissa of the logarithmic graph of FIG. 2.

The feeder circuit breakers are coordinated with the main circuit breaker in a conventional manner commonly referred to as selective coordination. In a power system coordinated in this manner, the closer the breaker is located to the source, the longer will be its time delay preceding tripping for a given overcurrent. Thus, the breaker closest to the fault, and between the source and the fault, will trip before the circuit breakers back of it in series, can trip. This coordination is illustrated in FIG. 2, where it will be seen that for any given current sufficiently high to cause tripping which passes through a feeder circuit breaker and the main circuit breaker, the feeder circuit breaker (operating on curves B' and B) will trip and interrupt the current therethrough before the main circuit breaker (operating on curve A') can trip.

It is to be understood that if a fault appears on bus 10, the feeder breakers normally do not see an overcurrent. Fault current flows only through the supply circuit 14 to produce tripping of the main circuit breaker 24. The current fed into the fault by the motor 18 acting during this time as a generator will be beneath the pickup value of the feeder circuit breaker trip controlling devices.

Heretofore, if the system of FIG. 1, as described up to this point, was to operate with the desired selectivity for all values of fault current up to the maximum available system current, then all of the circuit breakers, including the feeder circuit breakers, were required to have an interrupting capacity at least substantially equal to the maximum available system current. This has necessitated using relatively large and expensive circuit breakers for the feeders. As pointed out hereinabove, an object of my invention is to construct the system in such a way that: (a) the feeder circuit breakers can have a relatively low current-interrupting capacity in comparison to that of the main circuit breaker and yet can isolate high-current faults from the remainder of the system and (b) system selectivity is maintained for high values of fault current.

THE TRIGGERED VACUUM GAP DEVICES

I attain this objective by connecting across the conductors of the supply circuit 14 on the bus side of the main circuit breaker 24 a plurality of triggered vacuum gap devices 59a, 59b, and 59c. Gap devices 58a is connected across conductors 14a and 14b. Gap device 59b is connected across conductors 14b and 14c, and gap device 59c is connected across conductors 14a and 14c. Each of these triggered vacuum gap devices is of a conventional design, such as shown and claimed, for example, in U.S. Pat. Nos. 3,087,092-Lafferty and 3,303,376-Lafferty, both assigned to the assignee of the present invention. Accordingly, each comprises a pair of main electrodes 60 and 62 mounted within a highly evacuated insulating enclosure 65. The main electrodes are spaced apart to define a main gap 66 therebetween. A trigger electrode 67 extends into the enclosure and is normally electrically isolated from the two main electrodes by a trigger gap between the trigger electrode 67 and main electrode 62. When a suitable voltage pulse is applied to the trigger electrode 67, the trigger gap arcs over, thereby injecting charged conduction carriers into main gap 66 to cause an immediate arc-over of the main gap. Following such arc-over, current flows through the main gap until a natural current zero is reached, at which time the main gap recovers its dielectric strength and interrupts the circuit therethrough, assuming that the trigger gap is then not arcing. No current flows through the main arcing gap 66 on the next half-cycle of current unless the trigger gap is again arced over.

For supplying suitable voltage pulses to the trigger electrodes 67 of the three gap devices, I provide a conventional pulse source in the form of an oscillator 70. The oscillator is normally off but is rapidly turned on in response to an overcurrent in any one of the conductors of supply circuit 14. Current transformers 71a, 71b, or 71c, respectively coupled to the conductors of the supply circuit 14 and connected together in the same manner as current transformers 43a, 43b, and 43c, supply the pulse source 70 with information on the current passing through its conductors 14a, 14b, and 14c. When the instantaneous value of the highest of these currents exceeds a predetermined level, the pulse source 70 is turned on, thus supplying a voltage pulse to trigger electrodes 67 and causing arc-over of the trigger gaps and their associated main gaps 66.

The first voltage pulse is followed by a train of closely repetitive voltage pulses from the oscillating pulse source 70 which continue for a time interval of sufficient duration to permit the affected feeder circuit breaker to open. In the described system, this period will be approximately three cycles.

Each of the main gaps 66 arcs over in response to the first voltage pulse, as described above, and continues arcing, and therefore carrying current so long as the pulse source 70 supplies voltage pulses to its trigger electrode 67. On the first current zero following termination of the voltage pulses, the main gap recovers its dielectric strength and thus interrupts current flowing through the gap device.

RESPONSE TO A LOW CURRENT FAULT

In a preferred form of the invention, pulse source 70 is adjusted to turn on only when the current through one of the conductors 14a, 14b, or 14c rises to a value substantially equal to the current-interrupting capacity of the feeder circuit breakers 124 and 224. For lower values of current, the pulse source 70 remains inactive, and the system functions in a normal manner, relying only upon one or more of the circuit breakers 124, 224, and 24 to the extent needed to isolate the faults. For example, assume a fault on feeder 20 that results in fault current within the current interrupting rating of feeder circuit breaker 124. Feeder circuit breaker 124 responds to this fault by opening to isolate the fault from the remainder of the system. The other circuit breakers 24 and 224 and the gaps 59a, 59b, and 59c would remain inactive and in their conditions of FIG. 1, thus allowing service to be maintained over the rest of the system. As another example, assume a low current fault on feeder 22, the feeder circuit breaker 224 would open to isolate the fault while the other circuit breakers and the gap devices remain inactive. If the fault is a low current fault on bus 10, only the main circuit breaker 24 would open.

RESPONSE TO A HIGH CURRENT FAULT ON A FEEDER

Assume now that a fault develops on one of the feeders which results in current high enough to cause triggering of the gap devices 59a, 59b, and 59c. In a preferred form of the invention, the overcurrent tripping means of each feeder circuit breaker can respond sufficiently rapidly to any such high current fault on its associated feeder to produce a tripping operation of the feeder breaker (i.e., release of its trip latch) before the gap devices 59a, 59b, and 59c are triggered into conduction. Triggering of the gap devices does occur, however, immediately after such tripping and while the opening operation of the feeder circuit breaker is still underway.

As a more specific example, assume now that such a high current fault should occur on feeder 20. This will produce immediate tripping of the feeder circuit breaker 124, closely followed by triggering into conduction of the gap devices 59a, 59b, and 59c. The gap devices, upon being so triggered into conduction, establish short circuits therethrough across all the conductors of the supply circuit 14. These short circuits across the supply circuit divert current from the faulted feeder circuit 20 and reduce the voltage on the feeder circuit to a very low value. Accordingly, when the feeder circuit breaker 124 attempts to interrupt the circuit following the above-described triggering only a very low current is flowing therethrough and only a very low voltage is developed across its separated contacts. The feeder circuit breaker 124 can easily interrupt this current even if it has a very low current interrupting rating.

Following completion of the opening of the feeder circuit breaker in the above-described example, triggering of the gap device is terminated, thus allowing the gap device to interrupt the current therethrough and in effect turn off. This restores power to all of the system except the faulted feeder circuit, which is then isolated from the remainder of the system by the open feeder circuit breaker. During the above-described period while the gap devices 59a, 59b, and 59c are turned on, the main circuit breaker remains closed, thus allowing power to be supplied therethrough during and after the period when the gap devices are turned on.

The main circuit breaker is able to remain closed because its time delay period for high current faults exceeds the period that the gaps are turned on. As a specific example, about four cycles are needed to initiate tripping of the main circuit breaker for high current faults, whereas the gap devices remain turned on for only three cycles following fault inception. Thus, the high fault current flows for an insufficient period to effect tripping of the main circuit breaker.

RESPONSE TO A HIGH CURRENT FAULT ON THE BUS

In the event of a high current fault on bus 10, the gaps 59a, 59b, and 59c are quickly triggered into conduction. The gaps continue to conduct for the same period as above-described, after which triggering is terminated. The gaps recover their dielectric strength at the next current zero and thus interrupt the current therethrough, allowing current to again flow into the fault for the brief period needed to again trigger the gaps into conduction. The main circuit breaker 24 has remained closed during the preceding period, but at this point sufficient time has elapsed to cause tripping thereof. Such tripping isolates the source 12 from the bus 10 and the fault thereon.

The high speed triggering of the triggered vacuum gaps in response to a bus fault serves the highly desirable function of limiting arcing damage at the point of the fault. Since substantially all of the fault current is diverted through the gap devices, there is very little remaining current to cause damage at the point of the fault. If the system can tolerate fault current through the fault for the time needed to interrupt such current at the main circuit breaker, then suitable controls (not shown) can be provided to block triggering of the gap devices under bus fault conditions.

In some applications, it may be desirable to effect immediate tripping of the main circuit breaker in case of a bus fault. Such tripping can be effected by providing a conventional bus-differential relaying system (not shown) in addition to the current-sensing system shown. The bus differential relaying system senses the fault on the bus and effects immediate tripping of the main circuit breaker. A few cycles after tripping, the main circuit breaker interrupts the fault current. The triggered vacuum gaps are triggered into conduction even more quickly than the main circuit breaker can interrupt the fault current, even when the main circuit breaker is instantaneously tripped by the bus differential system. Thus, even where bus differential relaying is used, the triggered vacuum gap will serve to limit arcing damage at the point of the fault.

MODIFIED FORM OF FIG. 3.

FIG. 3 shows a modified form of the invention wherein the triggered vacuum gaps 59a, 59b, and 59c of FIG. 1 are replaced by triggered vacuum switches 359a, 359b, and 359c, respectively. These switches are preferably constructed in the manner shown and claimed in U.S. Pat. No. 3,489,873-Kurtz et al., assigned to the assignee of the present invention, and are therefore shown in schematic form only. The main difference between these switches and the gap devices of FIG. 1 is that one main electrode of each switch has a portion 370 that is movable into and out of engagement with the other main electrode, instead of being entirely fixed with respect to the other electrode as in FIG. 1. The main gaps are arced-over by pulse source 70 in the same manner as in FIG. 1. However, instead of allowing arcing to continue for the entire period during which conduction is desired, initial arc-over is followed by movement of contact portion 370 into engagement with the other electrode 360 to establish a metallic path through the switch. At the end of the desired conduction period, the contacts are reseparated to interrupt the circuit. Closing of the switches is effected by a suitable closing device 372 which drives all three movable contacts 370 in unison into their closed position, where they are releasably held by a suitable latch 376. Opening is effected by tripping latch 376 to allow an opening spring 380 to return the movable contacts 370 into their original open position. The main advantage obtained by using the movable electrode devices of FIG. 3 instead of the fixed electrode devices of FIG. 1 is that immediate closing of the contacts reduces the duration of the arcing period, thus reducing the deleterious effect on the device of such arcing and, accordingly, prolonging its life.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. In an electric power distribution system comprising a bus, a supply circuit for supplying power to said bus, and a plurality of feeder circuits for feeding power from said bus to loads, protective equipment comprising:
   a. feeder circuit breakers adapted when closed to respectively connect said feeder circuits to said bus,
   b. a main circuit breaker adapted when closed to connect said supply circuit to said bus,
   c. means comprising a triggered vacuum gap device for establishing a short circuit on said supply circuit on the bus side of said main circuit breaker when said triggered vacuum gap device is triggered into conduction,
   d. means responsive to a fault on any one of said feeder circuits producing current through the associated feeder circuit breaker above the current-interrupting rating of said feeder circuit breaker for triggering said gap device into conduction, thereby diverting current from said fault,
   e. means responsive to said feeder circuit fault for tripping open said feeder circuit breaker and for causing opening to be completed while said gap device is conducting, thus completing opening of said feeder circuit breaker at a time when the current therethrough is limited by conduction through said gap device,
   f. means for terminating said conduction through said gap device after said feeder circuit breaker has completed opening, thus allowing power from said supply circuit to be restored to said bus,
   g. and means for maintaining said main circuit breaker closed during said conduction through said gap device and for at least a short period following termination of said conduction through said gap device, whereby power from said supply circuit can be immediately supplied through said main circuit breaker to said bus upon the termination of said conduction through said gap device.

2. The apparatus of claim 1 in which:
a. said bus and said supply circuit are polyphase circuits,
b. said triggered vacuum gap device is connected across one pair of phases of said supply circuit and additional triggered vacuum gap devices are respectively connected across the remaining pairs of phases of said supply circuit, and
c. said means responsive to a fault on any one of said feeder circuits effects triggering of all of said triggered vacuum gap devices.

3. The apparatus of claim 1 in which:
a. said main circuit breaker includes overcurrent-responsive means for opening the main circuit breaker after a predetermined time in response to fault current therethrough produced by a feeder fault,
b. and said triggered vacuum gap is normally restored to its normally non-conducting state following inception of said feeder fault before said overcurrent-responsive means has had sufficient time to open said main circuit breaker.

4. The apparatus of claim 1 in which:
a. said main circuit breaker and said feeder circuit breakers each include overcurrent-responsive means for opening the associated circuit breaker with a time delay varying in duration inversely with respect to current magnitude,
b. for a given fault current, the time delay for opening of said main circuit breaker is greater than that for said feeder circuit breakers, and
c. said triggered vacuum gap device is normally restored to its normally non-conducting state following inception of said feeder circuit fault before said main circuit breaker has had sufficient time to open.

5. The apparatus of claim 1 in which the means for triggering said gap device into conduction is also responsive to faults on said bus and is operable in response to said bus faults for triggering said gap device into conduction before said main circuit breaker can open, thereby reducing the damage from arcing at the point of said bus fault.

6. The apparatus of claim 1 in which:
a. said triggered vacuum gap device includes electrodes which are relatively movable into and out of engagement with each other,
b. means is provided for producing engagement of said electrodes immediately following the triggering into conduction of said gap device, and
c. the means for terminating conduction through said gap device comprises means for separating said electrodes.

7. The apparatus of claim 2 in which:
a. each of said triggered vacuum gap devices includes electrodes which are relatively movable into and out of engagement with each other,
b. means is provided for producing engagement of the electrodes of all of said gap devices immediately following the triggering into conduction of said gap devices, and
c. means is provided for terminating conduction through all of said gap devices after said feeder circuit breaker has opened, said last-mentioned means comprising means for separating the electrodes of all of said gap devices.

8. The apparatus of claim 1 in which said means for terminating conduction through said gap device comprises means for discontinuing triggering of said gap device.

* * * * *